United States Patent
Neuman

(10) Patent No.: US 10,312,999 B2
(45) Date of Patent: Jun. 4, 2019

(54) HIGH-CAPACITY COMMUNICATIONS SATELLITE USING PASSIVE OPTICAL BEAMFORMING

(71) Applicant: The Boeing Company, Chicago, IL (US)

(72) Inventor: Michael Neuman, Rolling Hills, CA (US)

(73) Assignee: The Boeing Company, Chicago, IL (US)

( * ) Notice: Subject to any disclaimer, the term of this patent is extended or adjusted under 35 U.S.C. 154(b) by 441 days.

(21) Appl. No.: 15/078,413

(22) Filed: Mar. 23, 2016

(65) Prior Publication Data
US 2019/0068282 A1  Feb. 28, 2019

(51) Int. Cl.
*H04B 7/185* (2006.01)
*H04B 3/26* (2006.01)
*H01Q 3/26* (2006.01)

(52) U.S. Cl.
CPC ....... *H04B 7/18515* (2013.01); *H01Q 3/2676* (2013.01); *H01Q 3/2682* (2013.01)

(58) Field of Classification Search
CPC ............... H01Q 3/2676; H01Q 3/2682; H04B 7/1851–7/18519
See application file for complete search history.

(56) References Cited

U.S. PATENT DOCUMENTS

| | | |
|---|---|---|
| 5,424,862 A | 6/1995 | Glynn |
| 6,304,354 B2 | 10/2001 | Carlson |
| 6,452,546 B1 * | 9/2002 | Stephens ............... H01Q 3/2676 342/368 |
| 6,807,343 B2 * | 10/2004 | Tulchinsky .......... H01Q 3/2676 385/140 |
| 7,084,811 B1 | 8/2006 | Yap |

(Continued)

FOREIGN PATENT DOCUMENTS

| | | |
|---|---|---|
| WO | 9636138 A1 | 11/1996 |
| WO | 0802765 A1 | 1/1998 |
| WO | 9802765 A1 | 1/1998 |

OTHER PUBLICATIONS

Zhuang et al., "Novel Ring Resonator-Based Integrated Photonic Beamformer for Broadband Phased Array Receive Antennas—Part II: Experimental Prototype", J. Lightwave Technology, vol. 28, No. 1, Jan. 1, 2010, pp. 19-31.

(Continued)

*Primary Examiner* — Cassi J Galt
(74) *Attorney, Agent, or Firm* — Ostranger Chong Flaherty & Broitman P.C.

(57) ABSTRACT

A communications satellite system that provides one terabit/second throughput utilizing passive optical beamforming networks. An onboard telescope couples uplinked optical beams into an onboard optical signal processing system via an optical waveguide. The passive optical signal processing system comprises an optical demultiplexer, a multiplicity of single-sideband filters, and a multiplicity of optical beamforming networks. The optical beamforming networks and the SSB filters may comprise optical ring resonators. The output of the optical signal processing system is converted into electrical signals which are sent to a phased-array transmit antenna. The user links are in the radio-frequency (RF) domain.

16 Claims, 10 Drawing Sheets

(56) References Cited

U.S. PATENT DOCUMENTS

| | | | |
|---|---|---|---|
| 7,929,864 B2* | 4/2011 | Chen | H01Q 3/2676 398/115 |
| 9,838,125 B2* | 12/2017 | Prucnal | H04B 10/25752 |
| 9,941,967 B2* | 4/2018 | Welle | H04B 10/29 |
| 2012/0328298 A1 | 12/2012 | Yi et al. | |
| 2013/0194134 A1 | 8/2013 | Beeker et al. | |
| 2013/0309975 A1 | 11/2013 | Kpodzo et al. | |
| 2017/0214462 A1* | 7/2017 | Busche | H04B 7/18504 |
| 2017/0310006 A1* | 10/2017 | Vidal Drummond | H01Q 3/2676 |

OTHER PUBLICATIONS

Bach et al., "InP-Based Waveguide-Integrated Photodetector with 100-GHz Bandwidth", IEEE J. Selected Topics in Duantum Electronics, vol. 10, No. 4, Jul./Aug. 2004, pp. 668-672.

Roeloffzen et al., "Ring Resonator-Based Tunable Optical Delay Line in LPCVD Waveguide Technology", Proc. 9th IEEE/LEOS Symp. Benelux Chapter, Dec. 1-2, 2005, Mons, Belgium, pp. 79-82.

Zhuang et al., "Novel Ring Resonator-Based Optical Beamformer System and Experimental Results", Proc. Symp. IEEE/LEOS Benelux Chapter, 2007, Brussels, pp. 239-242.

Perlot et al., "Optical GEO Feeder Link Design", Future Network & Mobile Summit 2012 Conf. Proc., 2012, pp. 1-8.

Zhuang et al., "Ring Resonator-Based Single-Chip 1×8 Optical Beam Forming Network in LPCVD Waveguide Technology", Proc. 11th IEEE/LEOS Symp. Benelux Chapter, Nov. 30-Dec. 1, 2006, Eindhoven, The Netherlands, pp. 45-48.

Suzuki et al., "Multibeam Phased Array Feed System Using Beam Group Concept", NTT Technical Review, vol. 5, No. 1, Jan. 2007, pp. 61-69.

Extended European Search Report dated Aug. 17, 2017 in European Patent Application No. 17162200.4 (European counterpart of the instant patent application).

* cited by examiner

HIGH-CAPACITY COMMUNICATIONS SATELLITE USING PASSIVE OPTICAL BEAMFORMING

BACKGROUND

The technology disclosed herein generally relates to communications satellite systems and methods, and more particularly relates to the broadcast of signals on a local-area basis with some of the signal frequency bands being repeated for different areas.

"Spot" broadcast beams, which are smaller than regional beams, have been used for satellite broadcasting. In accordance with one type of spot beam broadcast, a desired region, such as a country, is covered by a uniform grid of evenly spaced spot beams having equal sizes and output power levels. To assure complete area coverage, adjacent beam spots are overlapped. Different and non-overlapping frequency bands are assigned to the signals within each pair of adjacent beams to prevent cross-beam signal interference. In accordance with some configurations, four different frequency bands are employed, with each beam being separated from the next closest beam with the same frequency band by at least one other beam having a different frequency band. The uniform spot beams provide complete coverage of the desired larger regional area without significant interference between beams.

Uplink and downlink antennas may be implemented with any conventional antennas used in satellite communications. In various embodiments, antennas are implemented with digital or analog beamforming antennas having any number of independently-addressable transmit/receive elements. Examples of such antennas include various spot beam dishes, multi-beam feed antennas, direct radiating array antennas and/or phased array antennas which are commercially available.

This is great demand for communications satellites that have high throughput (i.e., (bit rate transmitted/bandwidth used)×bandwidth). This means that communications satellite antennas should have the capability to produce a large number of spot beams with advanced beamforming. Beamforming in the microwave frequency domain is prohibitive because the microwave beamforming components consume the satellite's power and mass resources. Performing onboard beamforming in the optical domain has the potential to ameliorate this resource problem. In addition, optical systems have more available spectral bandwidth In accordance with currently proposed optical communications payload architectures, the optical beamforming is achieved utilizing active units. These units often include lasers, optical receivers and MEMS switching networks. These active units consume large amounts of the satellite's power and mass resources. Active units also greatly reduce the satellite's reliability.

A communications satellite system that uses passive rather than active optical components to process optical beams received from a ground station would be a welcome advance in the art.

SUMMARY

The subject matter disclosed in detail below is directed to a communications satellite system that provides one terabit/second throughput utilizing passive optical beamforming networks. This greatly reduces the demand on the satellite's power and mass resources, in addition to increasing the reliability of the communications system. Additionally, the disclosed communications satellite system utilizes a method for optically selecting the desired satellite spot beam antenna from which the communications signal will be transmitted. As is the case for beamforming, the beam selection function uses only passive optical components rather than mechanical or electrical optical switches.

In accordance with the embodiments disclosed herein, an onboard telescope receives optical beams uplinked from a ground-based gateway. The receiver telescope couples the uplinked beams into an onboard optical signal processing system via an optical waveguide. The onboard optical signal processing system comprises a passive optical demultiplexer, a multiplicity of passive single-sideband (SSB) filters, and a multiplicity of passive optical beamforming networks. The passive optical demultiplexer splits the incoming optical signal into a multiplicity of frequency bandwidths. Before optical beamforming by respective optical beamforming networks, the optical signals of different frequency bandwidths are filtered by respective SSB filters. The optical beamforming networks and the SSB filters may comprise optical ring resonators. The output of the optical signal processing system is converted into electrical radio frequency (RF) signals which are sent to a phased-array transmit antenna. The user links are in the radio-frequency (RF) domain.

One aspect of the subject matter disclosed in detail below is a communications satellite comprising: a lens; a passive optical signal processing system optically coupled to the lens and configured to split modulated optical carrier signals carrying data which pass through the lens into a multiplicity of optical signals and then make time delay adjustments that would enable the formation of optical beams from those optical signals; a multiplicity of photonic sensors for converting the optical signals output by the passive optical signal processing system into electrical signals; and a transmit antenna array comprising a multiplicity of antenna elements electrically coupled to the photonic sensors and configured to broadcast data-carrying radio-frequency signals in a direction which is a function of the time delay adjustments made by the passive optical signal processing system. In accordance with some embodiments, the passive optical signal processing system comprises: a multiplicity of optical beamforming networks, each optical beamforming network being a binary tree-based optical beamforming network comprising optical ring resonators and optical splitters optically coupled by waveguides; an optical demultiplexer having an input coupled to the lens and a multiplicity of outputs equal in number to the number of optical beamforming networks; and a multiplicity of single-sideband filters respectively optically coupled to respective outputs of the optical demultiplexer and to an input of a respective optical beamforming network.

Another aspect of the subject matter disclosed in detail below is a method for broadcasting a radio-frequency beam from a satellite in orbit, comprising: (a) uplinking an optical beam comprising optical carrier signals of different wavelengths from a ground station to a telescope onboard the satellite, wherein each optical carrier signal is modulated to carry a respective set of data; (b) using passive optical beamforming networks configured with preset time delays for time delaying respective optical beam components for each modulated optical carrier signal of different wavelength; and (c) transmitting a radiofrequency beam at a steering angle specified by the preset time delays in the passive optical beamforming networks, the transmitted radiofrequency beam containing the respective sets of data. This method may further comprise demultiplexing the uplinked optical beam to form the modulated optical carrier signals of different wavelengths prior to step (b). In the embodiments disclosed below, step (b) comprises time delaying at least some of the modulated optical carrier signals of different wavelengths using one or more optical ring resonators. The method may further comprise single-sideband filtering the modulated optical carrier signals of different wavelengths subsequent to demultiplexing and prior to step (b).

A further aspect of the subject matter disclosed herein is a method for broadcasting a radio-frequency beam from a satellite in orbit, comprising: uplinking a wavelength-division multiplexed optical beam to the satellite, the components of the wavelength-division multiplexed optical beam comprising respective optical carrier signals having different wavelengths which are modulated to carry data; splitting each of the modulated optical carrier signals into a multiplicity of optical signals; making time delay adjustments that would enable the formation of optical beams from those optical signals; converting the optical signals with time delay adjustments into electrical signals; and broadcasting radio-frequency signals in a direction which is a function of the time delay adjustments, the radio-frequency signals being modulated to carry the data contained in the wavelength-division multiplexed optical beam. This method may further comprise single-sideband filtering the modulated optical carrier signals of different wavelengths subsequent to splitting and prior to making time delay adjustments.

Yet another aspect is a communications satellite system comprising: an optical gateway configured to transmit a wavelength-division multiplexed optical beam, the components of the wavelength-division multiplexed optical beam comprising respective optical carrier signals having different wavelengths which are modulated to carry data; a receive antenna configured to receive radio-frequency signals; and a communications satellite in orbit, wherein the communications satellite comprises: a telescope configured to receive the wavelength-division multiplexed optical beam from the optical gateway; a passive optical signal processing system optically coupled to the telescope and configured to split modulated optical carrier signals carrying data which pass through the lens into a multiplicity of optical signals and then make time delay adjustments that would enable the formation of optical beams from those optical signals; a multiplicity of photonic sensors for converting the optical signals output by the passive optical signal processing system into electrical signals; and a transmit antenna array comprising a multiplicity of antenna elements electrically coupled to the photonic sensors and configured to broadcast data-carrying radio-frequency signals in a direction which is a function of the time delay adjustments made by the passive optical signal processing system, wherein the time delay adjustments are selected so that the broadcast data-carrying radio-frequency signals will be received by the receive antenna.

Other aspects of communications satellite systems and methods that utilize passive optical beamforming to convert uplinked optical signals into RF spot beams are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of a communications satellite system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
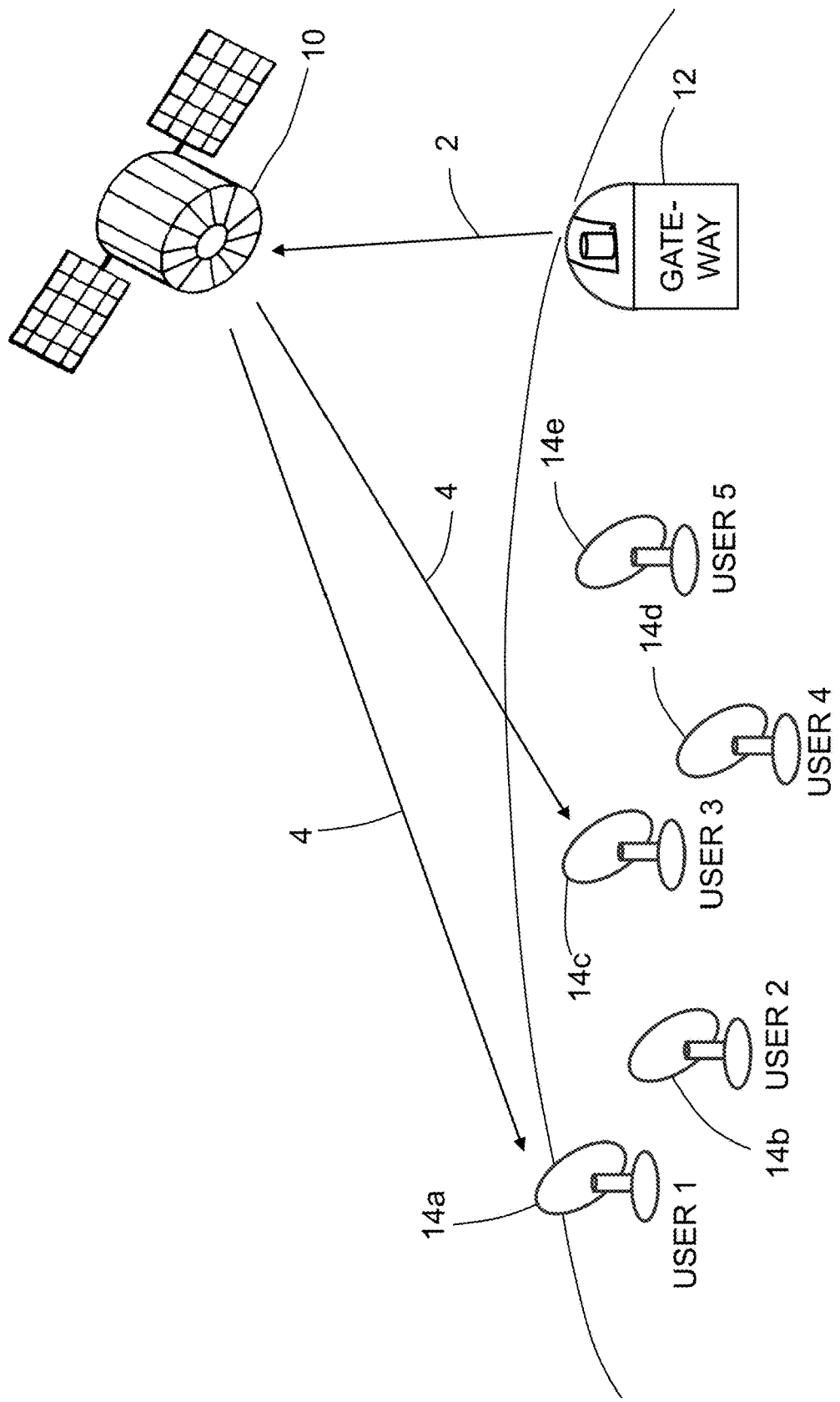
FIG. 1 is a diagram representing a scenario in which a telecommunication satellite receives optical beams from a ground-based gateway via an optical feeder uplink and then broadcasts a uniform grid of evenly spaced spot beams over a geographical area.

FIG. 1 is a diagram representing a scenario in which a communications satellite 10 receives optical beams from a ground-based gateway 12 via an optical feeder uplink 2 and then broadcasts a uniform grid of evenly spaced spot beams 4 to respective ground-based antennas (e.g., antennas 14a through 14e) located in respective user regions. The spot beams 4 comprise RF signals, which are within the $K_u$ band, which is the 12-18 GHz portion of the electromagnetic spectrum in the microwave range of frequencies. The gateway beam wavelength is preferably about 1550 nm, which is in the infrared range.

To receive uplinked optical signals, the communications satellite 10 may comprise a pointing/tracking/acquisition (PTA) telescope (not shown in FIG. 1). A typical PTA telescope comprises an optical telescope assembly mounted on a gimbal assembly. Typically, the pointing, acquisition and tracking system uses two-axis gimbals for coarse pointing control to an accuracy of several hundred micro-radians and a fast steering mirror for fine track control to maintain pointing to within micro-radians. Such telescopes are capable of transmitting and receiving free-space optical signals through the atmosphere. To transmit RF spot beams, the satellite 10 is equipped with a phased-array transmit antenna (not shown in FIG. 1).

The payload for a single satellite of the type proposed herein is designed to be capable of producing a throughput of 1 terabit/second. Data are multiplexed over several wavelengths around 1550 nm using wavelength-division multiplexing, which is a technology that multiplexes a number of optical carrier signals onto a single optical fiber by using different wavelengths (i.e., colors) of laser light. The system proposed herein has the following specifications: (1) the user beams should be within the $K_u$ band spectrum (12-18 GHz); (2) the satellite power used should not exceed 20 kW; (3) the gateway beam wavelength may be within the infrared light wavelength range (e.g., 1550 nm); and (4) the optical components must be able to survive in the space environment.

This disclosure proposes a system that may meet the foregoing specifications. The proposed system relies on passive optical beamforming to produce a spot beam in a specified direction (i.e., a specified angle relative to the spacecraft frame of reference) in response to receipt of an uplinked optical beam comprising multiple optical carrier signals having unique wavelengths (i.e., colors) of laser light. Each system module comprises a plurality of passive optical beamforming networks, each passive optical beamforming network receiving an optical signal of a respective unique wavelength, the outputs of the plurality of passive optical beamforming networks being multiplexed to form a plurality of elements of one spot beam. The time delays in the optical beamforming networks are pre-configured so that respective elements of a transmit antenna array will transmit a spot beam that is steered in the aforementioned specified direction relative to the frame of reference of the satellite. The satellite is equipped with a multiplicity of such system modules for transmitting a multiplicity of spot beams that will cover a desired geographical area when the satellite is properly positioned and oriented in geosynchronous orbit.

The optical gateway modulation format may be 8-phase-shift keying (PSK) modulation having a bandwidth efficiency of 2.5 bps:

$$E_s(t) = s_{i1} \cos(\omega_s t) + s_{i2} \sin(\omega_s t)$$

Since user frequencies are at $K_u$ band, the PSK bits can be encoded onto a $K_u$ band radio frequency carrier:

$$S_i(t) = \cos(\omega_{RF} t + E_s(t))$$

The waveform $S_i(t)$ is modulated with the optical wavelength of 1550 nm for transmission to the satellite:

$$y(t) = \cos(\omega_{OPT} t + S_i(t))$$

Figure 2:
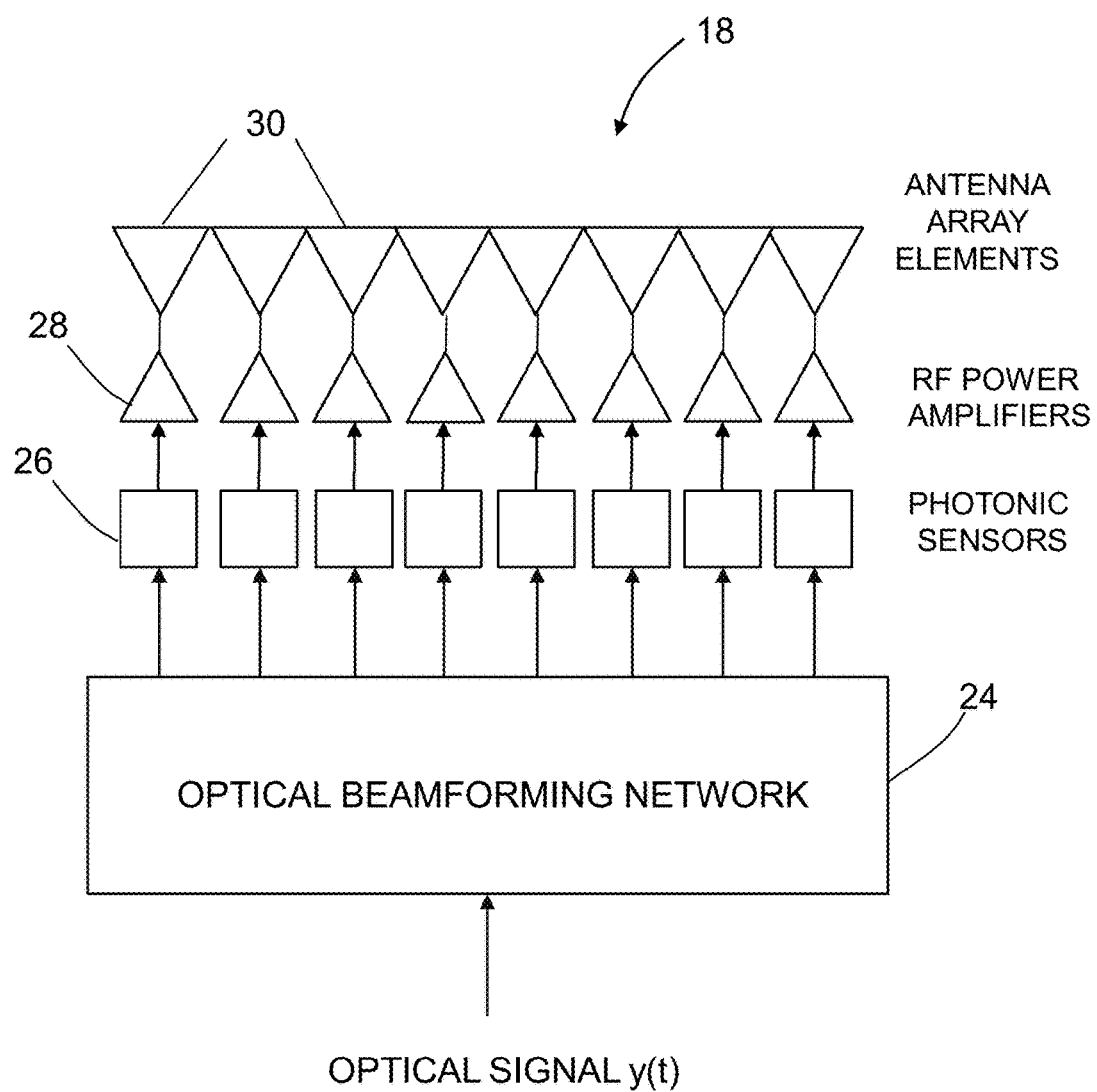
FIG. 2 is a diagram showing some components of a subsystem for receiving an optical beam and then broadcasting an RF beam in a specified direction, which RF beam carries data extracted from the optical beam.

FIG. 2 is a block diagram showing the optical beamforming network concept. An optical beamforming network 24 receives the optical signal y(t) and performs amplitude and time delay adjustment. In the specific example depicted in FIG. 2, the single optical beamforming network 24 splits the optical signal y(t) into M=8 optical signals and then performs amplitude and time delay adjustment of those optical signals to facilitate the formation of a spot beam by a phased-array transmit antenna comprising M=8 antenna array elements 30. More specifically, the time delays are designed to enable the phased-array transmit antenna array to transmit an RF beam having a specified steering angle. In accordance with preferred embodiments disclosed in detail below, the optical beamforming network 24 utilizes optical couplers for amplitude adjustment and optical ring resonators for time delay. The time-delayed and amplitude-adjusted optical signals output by the optical beamforming network 24 are converted into the electrical domain by respective photonic sensors 26 (e.g., photodetectors). Those electrical signals are then amplified by RF power amplifiers 28. The amplified RF signals are output to the antenna array elements 30 of the phased-array transmit antenna.

Figure 3:
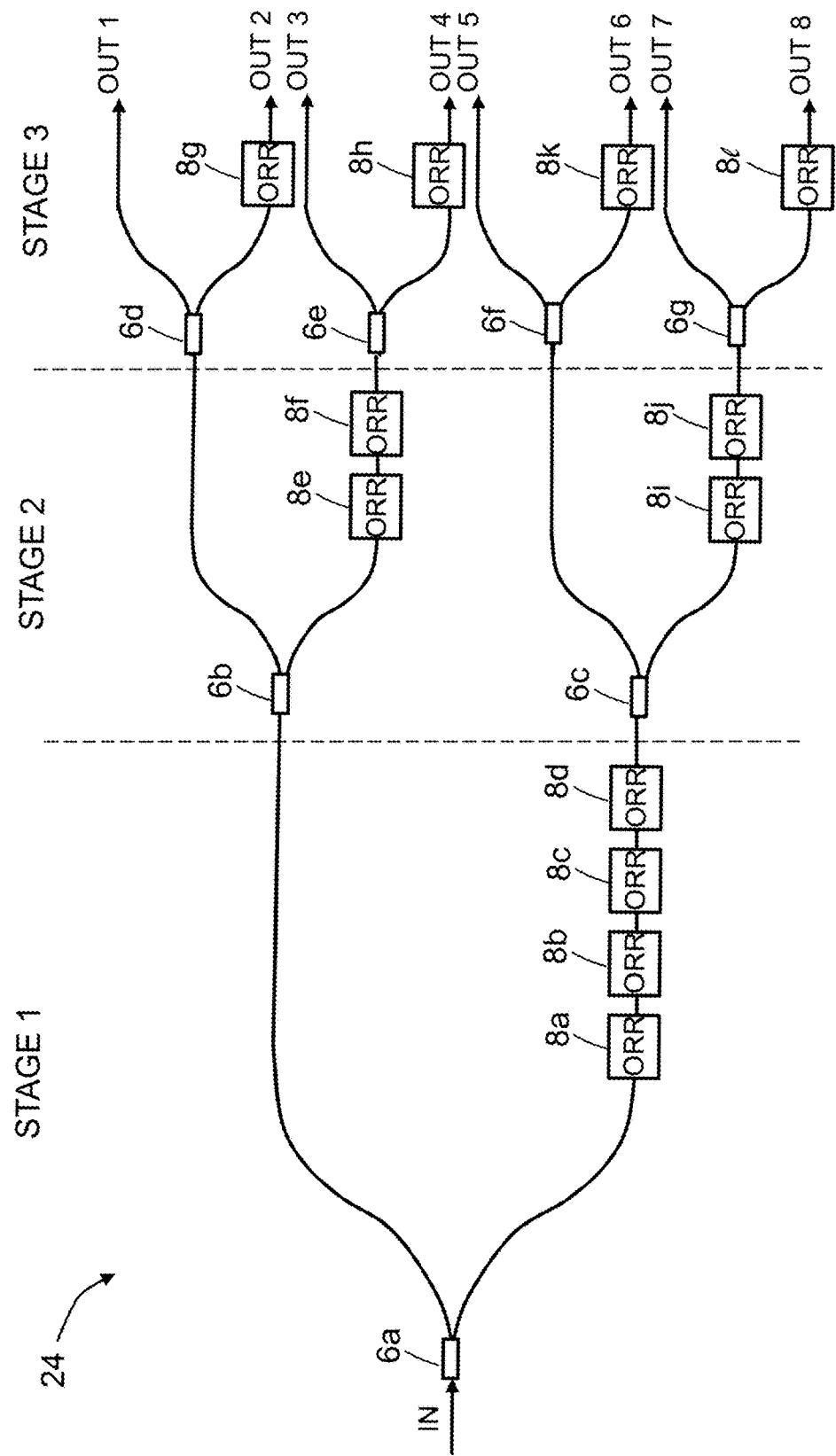
FIG. 3 is a diagram showing a binary tree-based 1×8 optical beamforming network consisting of eight optical ring resonators and seven optical splitters.

In accordance with one implementation, the optical beamforming network 24 may be a binary tree-based 1×8 optical beamforming network having the three-stage structure shown in FIG. 3. This specific implementation consists of eight optical ring resonators (ORRs) designed to provide specified time delays and seven optical splitters. The arrow labeled "IN", the curved lines connecting the splitters and optical ring resonators, and the arrows respectively labeled "OUT 1" through "OUT 8" represent respective waveguides (e.g., optical fibers).

In Stage 1, the waveguide labeled "IN" in FIG. 3 guides an optical signal from the demultiplexer into a first splitter 6a. The splitter 6a splits the IN optical beam into two optical signals: one of which propagates into a splitter 6b that is part of Stage 2 and the other of which passes through a cascade of four optical ring resonators (ORRs) 8a, 8b, 8c and 8d, which are part of Stage 1. The optical signal exiting optical ring resonator 8d propagates via a waveguide to splitter 6c of Stage 2.

Referring to Stage 2 in FIG. 3, the splitter 6b splits the optical signal from splitter 6a into two optical beams: one of which propagates into a splitter 6d that is part of Stage 3 and the other of which passes through a cascade of two optical ring resonators (ORRs) 8e and 8f, which are part of Stage 2. The optical signal exiting optical ring resonator 8f propagates via a waveguide to splitter 6e of Stage 3. In addition, the splitter 6b splits the optical signal from optical ring resonator 8d into two optical beams: one of which propagates into a splitter 6f that is part of Stage 3 and the other of which passes through a cascade of two optical ring resonators (ORRs) 8g and 8h, which are part of Stage 2. The optical signal exiting optical ring resonator 8h propagates via a waveguide to splitter 6g of Stage 3.

Referring to Stage 3 in FIG. 3, the splitter 6d splits the optical signal from splitter 6b into two optical beams: one of which exits the optical beamforming network 24 via a waveguide OUT 1 and the other of which exits the optical beamforming network 24 via a waveguide OUT 2 after passing through a single optical ring resonator 8i which is part of Stage 3. In addition, the optical signal exiting optical ring resonator 8f is split by splitter 6e which is part of Stage 3. The splitter 6e splits the optical signal from optical ring resonator 8f into two optical beams: one of which exits the optical beamforming network 24 via a waveguide OUT 3 and the other of which exits the optical beamforming network 24 via a waveguide OUT 4 after passing through a single optical ring resonator 8j which is part of Stage 3. Similarly, the splitter 6f splits the optical signal from splitter 6c into two optical beams: one of which exits the optical beamforming network 24 via a waveguide OUT 5 and the other of which exits the optical beamforming network 24 via a waveguide OUT 6 after passing through a single optical ring resonator 8k which is part of Stage 3. In addition, the optical signal exiting optical ring resonator 8h is split by splitter 6g which is part of Stage 3. The splitter 6g splits the optical signal from optical ring resonator 8h into two optical beams: one of which exits the optical beamforming network 24 via a waveguide OUT 7 and the other of which exits the optical beamforming network 24 via a waveguide OUT 8 after passing through a single optical ring resonator 8t which is part of Stage 3.

Each of the outputs from the optical beamforming network 24 are then converted into the electrical domain, amplified and sent to the respective elements of the transmit antenna array as previously described with reference to FIG. 2, which transmit a spot beam having a specified steering angle.

Figure 4:
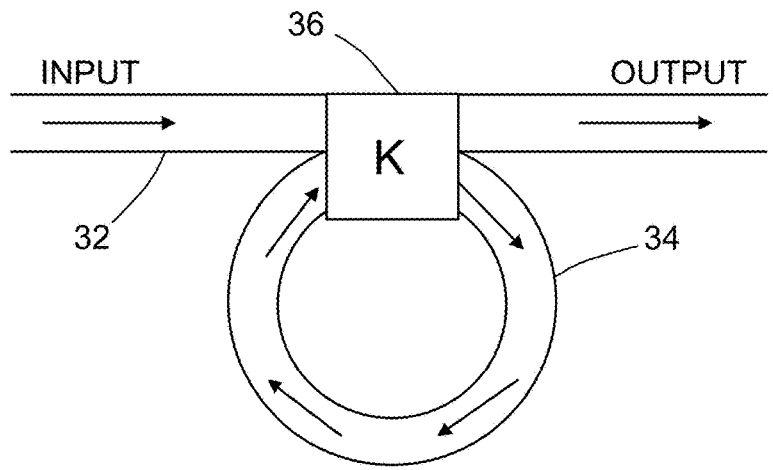
FIG. 4 is a diagram showing the structure of an optical ring resonator.

FIG. 4 shows the structure of a typical optical ring resonator 8. An optical ring resonator is a time delay device comprising a circular waveguide 34 that is coupled in parallel to a straight waveguide 32 by means of a power coupler 36. Ignoring propagation losses, an optical ring resonator can be viewed to be an all-pass filter having a periodic, bell-shaped group delay response. The maximum group delay occurs at the resonance frequency, which can be set by tuning the round-trip phase shift of the optical ring resonator 8. Similarly, the maximum delay can be set by designing the power coupler 36 to produce the desired coupling coefficient K of the resonator. The power coupler 36 can be realized as a symmetric Mach-Zehnder interferometer with an optical phase shifter in one of its arms.

In operation, a portion of the optical signal propagating through straight waveguide 32 will couple to the circular waveguide 34. The circular waveguide supports circulating waves that resonate at the guide wavelength. Resonances are spaced periodically, with a separation between consecutive resonances called free specular range. The ORR enhances the physical length of the circular waveguide by forcing the light to traverse the circumference multiple times. The length of the optical path of the circular waveguide 34 can be selected to produce a desired resonance frequency of the optical ring resonator 8. As such, a different frequency of light will couple to the optical ring resonator 8. The power coupler 36 can be configured to control the power of the optical signal that couples to the optical ring resonator 8.

Figure 5:
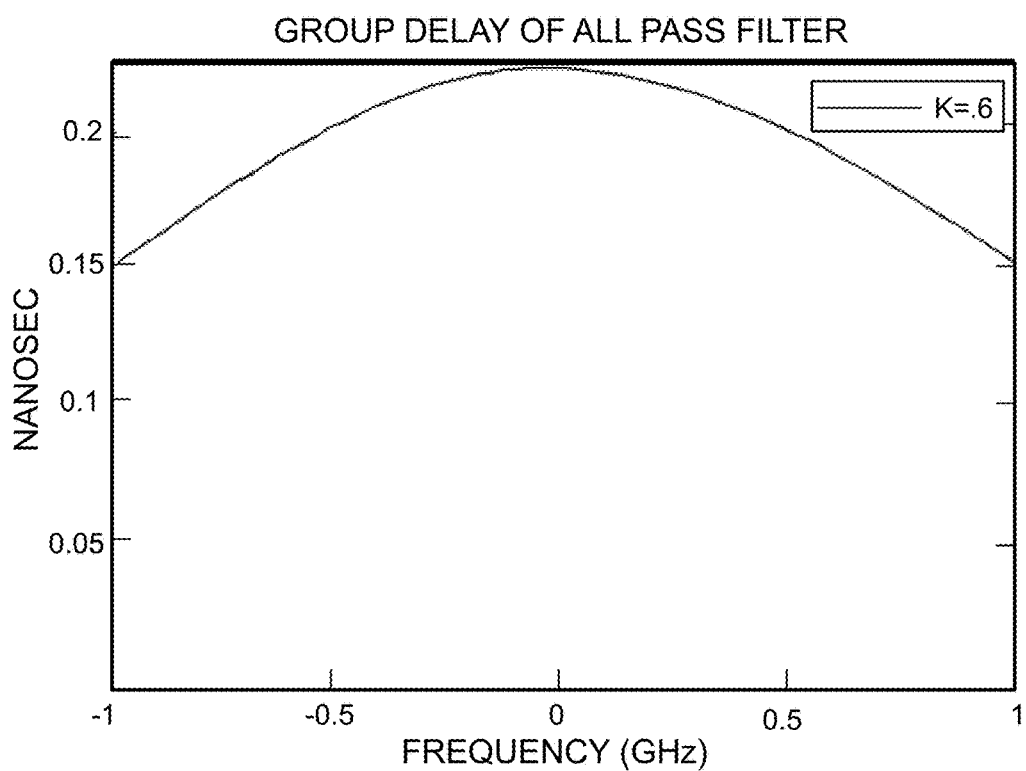
FIG. 5 is a graph showing the group delay of a single optical ring resonator having a power coupling coefficient K=0.6.

A single ring resonator 8 having a power coupling coefficient K=0.6 in theory would provide a group delay as shown in FIG. 5, but it is bandwidth limited. There is a tradeoff between the maximum delay achievable and the delay bandwidth. This can be addressed by cascading multiple optical ring resonators, as shown in FIG. 3. The resulting group delay response would be equal to the sum of the individual group delay responses. (In signal processing, group delay is a measure of the time delay of the amplitude envelopes of the various sinusoidal components of a signal through a device and is a function of frequency. In contrast, phase delay is a measure of the time delay of the phase as opposed to the time delay of the amplitude envelope.)

A person skilled in the art has the ability to design optical ring resonators that provide selected time delays with desired performance attributes of maximum delay and delay bandwidth.

The modulation of the previously discussed PSK gateway signal y(t) has a bandwidth of 24 GHz, which is incompatible with the performance of a typical optical ring resonator. Accordingly, there is a need to reduce y(t)'s modulation bandwidth or increase the optical ring resonator's usable bandwidth or both.

Figure 6:
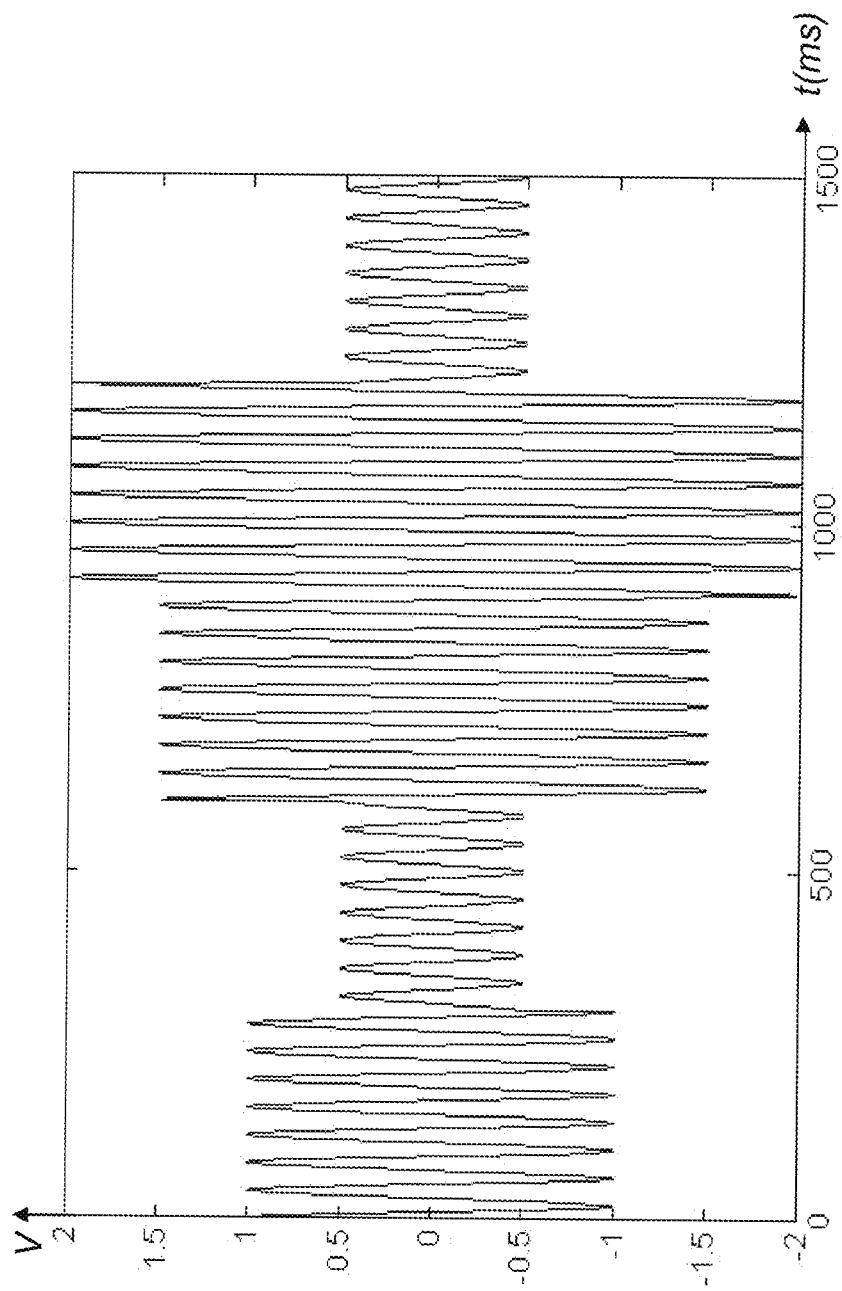
FIG. 6 is a graph showing a carrier wave which has been amplitude modulated using a four-level amplitude-shift keying scheme.

In accordance with one embodiment, y(t)'s modulation bandwidth can be reduced by using amplitude-shift keying, which is a form of amplitude modulation that represents digital data as variations in the amplitude of the carrier wave. For instance, a four-level encoding scheme can represent two bits with each shift in amplitude, as shown in FIG. 6. The equation for the signal at RF frequency takes the following form:

$$s(t)=\Sigma_k \alpha_k \cos(2\pi f_{RF} t)$$

where $\alpha_k \in \{0.5; 1; 1.5; 2\}$ with 00→0.5, 01→1, 11→1.5, and 10→2.

Figure 7:
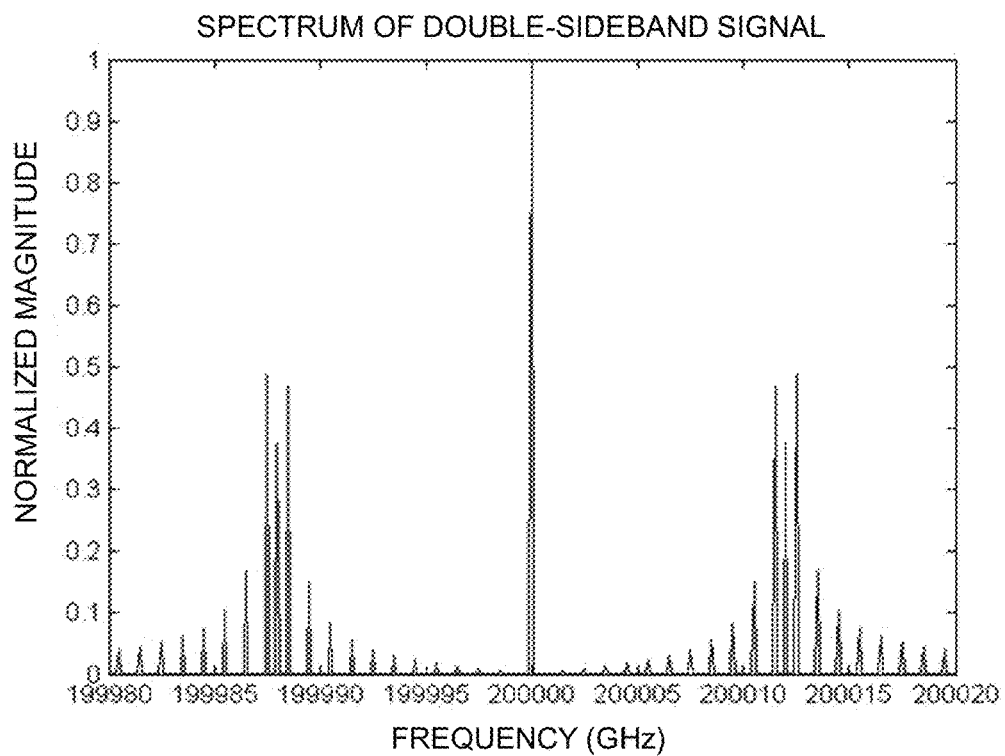
FIG. 7 is a graph showing the spectrum of a typical double-sideband signal. The vertical axis is normalized magnitude and the horizontal axis is frequency in GHz.
Figure 8:
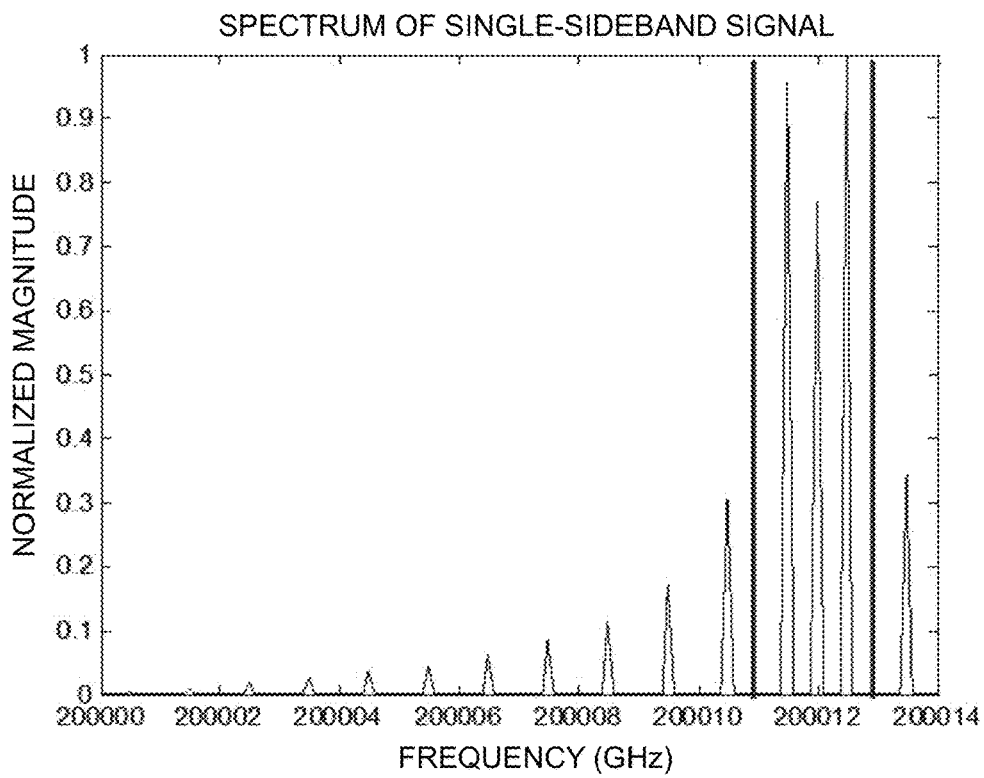
FIG. 8 is a graph showing the spectrum of a single-sideband signal that would be the result of single-sideband modulation of the double-sideband spectrum seen in FIG. 7.

The gateway signal's bandwidth can be further reduced using optical single sideband (SSB) modulation. FIG. 7 is a graph showing the spectrum of a typical double-sideband signal. An optical SSB filter can be used to suppress one of the sidebands. FIG. 8 shows the spectrum of the resulting single-sideband signal output by an SSB filter.

Figure 9:
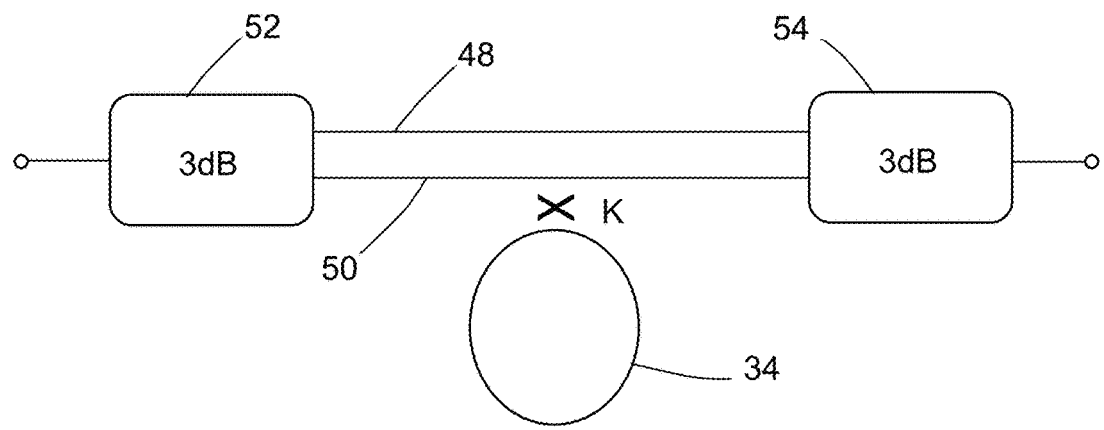
FIG. 9 is a diagram identifying some of the components of an optical single-sideband filter in accordance with one embodiment.

In accordance with one embodiment partly depicted in FIG. 9, an optical single-sideband filter 44 comprises a splitter 52 and a coupler (a.k.a. combiner) 54 which are optically coupled by means of a pair of waveguides 48 and 50. The waveguide 48 incorporates an asymmetric Mach-Zehnder interferometer (not shown). An optical ring resonator 34 is coupled to the waveguide 50 by means of a symmetric Mach-Zehnder interferometer (indicated by an X in FIG. 9). The power coupling coefficient is indicated by K in FIG. 9. The free spectral range and the widths of the passband and stopband are selected such that one sideband of the modulated optical signal is passed and the other sideband is suppressed.

Figure 10:
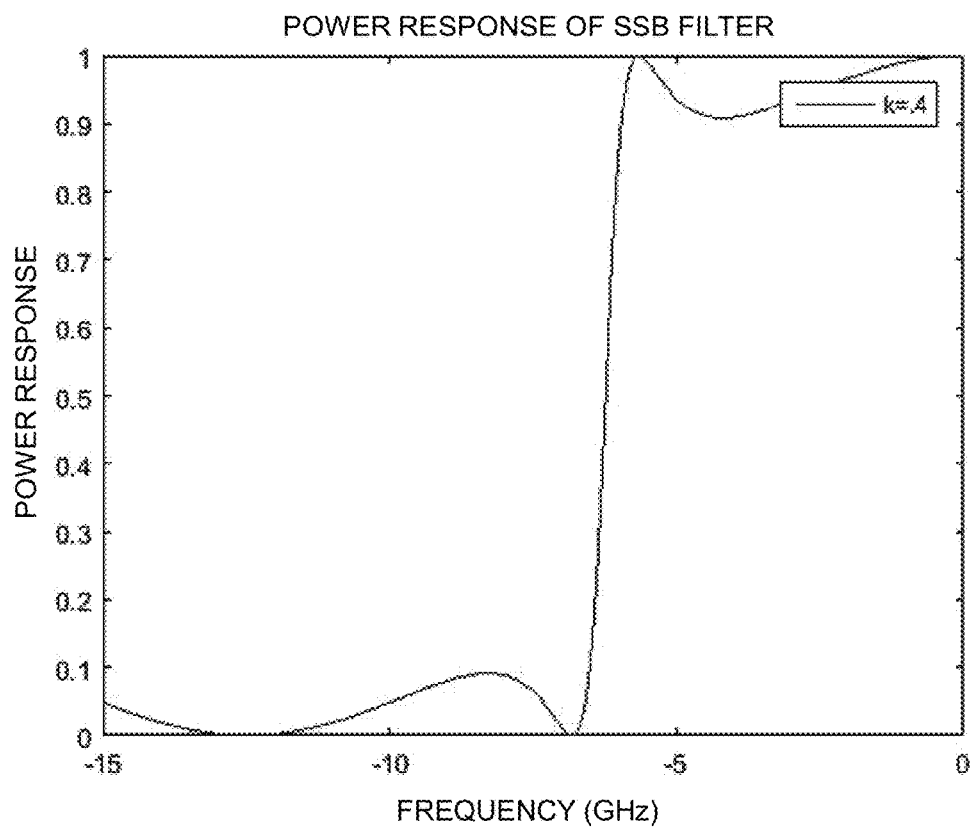
FIG. 10 is a graph showing a simulated power response of a single-sideband filter when the power coupling coefficient K=0.4 and the group delay T=4 nsec. The vertical axis is power response and the horizontal axis is frequency in GHz.

FIG. 10 is a graph showing a simulated power response of an SSB filter when the power coupling coefficient K=0.4 and the group delay T=4 nsec. The power response shows excellent rejection in the frequency range of 6 to 15 GHz.

Multiple subsystem modules of the type depicted in FIG. 2 and implemented using optical beamforming networks of the type shown in FIG. 3 can be provided onboard a communications satellite for processing a wavelength-division multiplexed optical beam, each wavelength being processed by a unique one of the multiplicity of optical beamforming networks. Multiple optical beamforming networks 24 of the type depicted in FIG. 3 can be connected to the outputs of a common optical demultiplexer, which demultiplexer the wavelength-division multiplexed optical beam into respective beams of different wavelengths.

Figure 11:
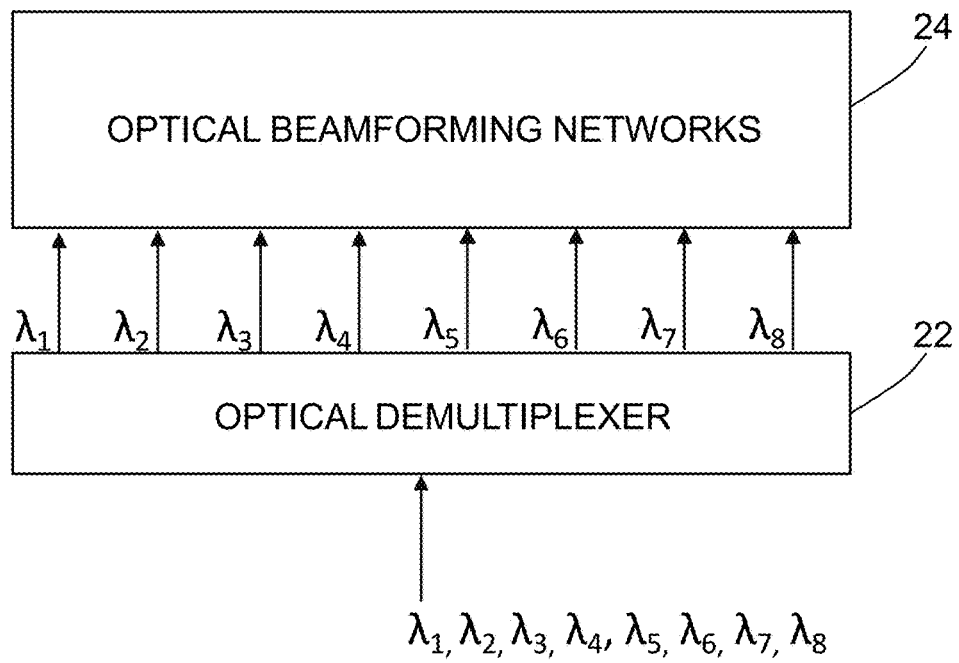
FIG. 11 is a block diagram showing an optical demultiplexer that receives a wavelength-division multiplexed composite optical signal from a receiver telescope and outputs a multiplicity of optical beams having respective different wavelengths to a multiplicity of optical beamforming networks.

More specifically, FIG. 11 shows an optical demultiplexer 22 which is receiving an uplinked wavelength-division multiplexed composite optical signal. In this example, the wavelength-division multiplexed composite optical comprises eight different wavelengths $\lambda_1, \lambda_2, \lambda_3, \lambda_4, \lambda_5, \lambda_6, \lambda_7,$ and $\lambda_8$. The optical demultiplexer 22 comprises optical splitters which separate the multiplexed wavelengths, outputting eight optical beams having respective wavelengths $\lambda_1$ through $\lambda_8$ to respective optical beamforming networks 24 via respective waveguides (e.g., respective optical fibers). Each of eight optical beamforming networks 24 receives an optical beam having one of the respective wavelengths $\lambda_1$, $\lambda_2$, $\lambda_3$, $\lambda_4$, $\lambda_5$, $\lambda_6$, $\lambda_7$, and $\lambda_8$. The optical beamforming networks 24 perform amplitude and time delay adjustment of those optical signals to facilitate the formation of a transmit beam by the phased-array transmit antenna (not shown in FIG. 11).

Figure 12:
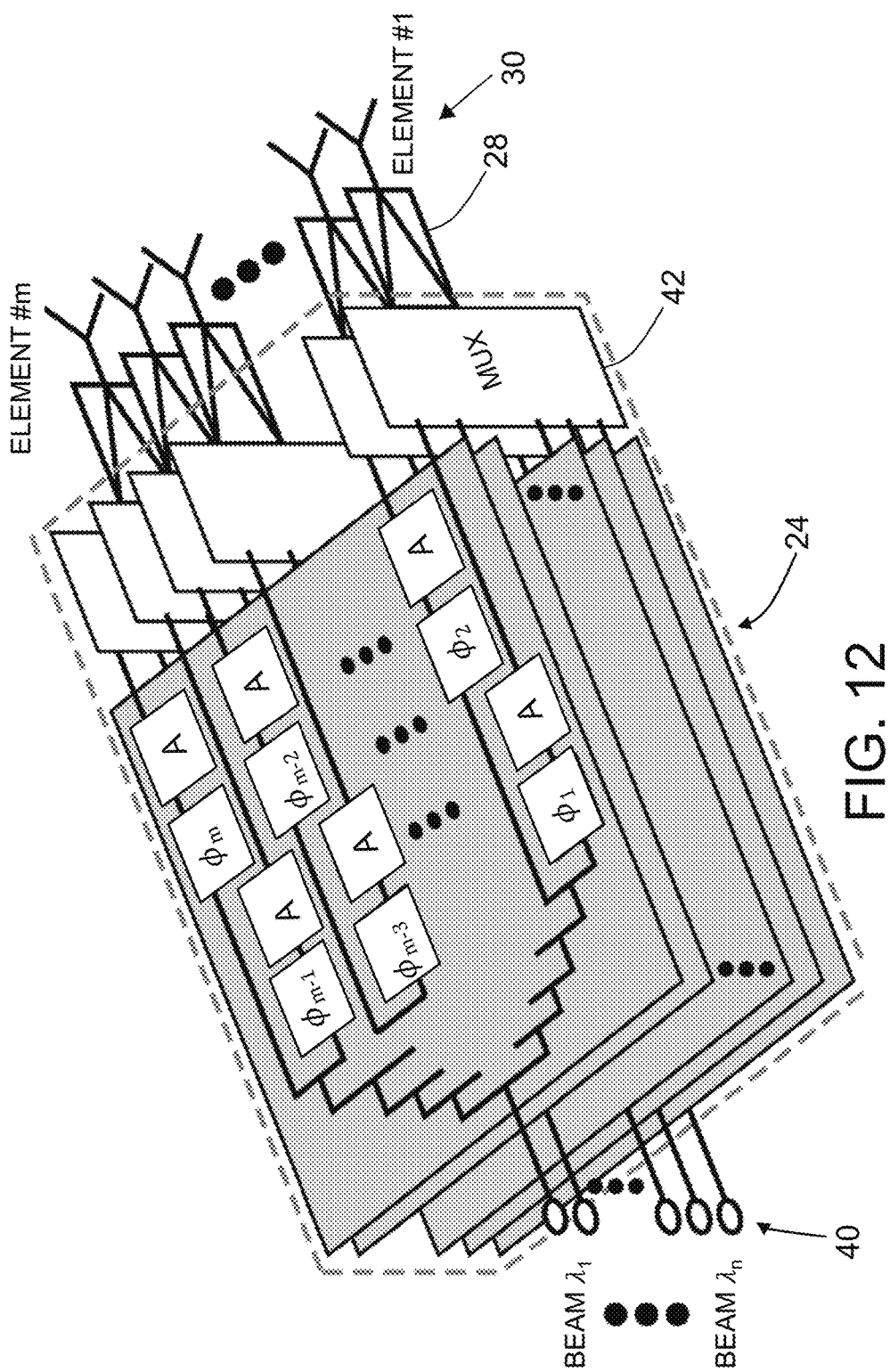
FIG. 12 is a diagram showing components of a multi-beam antenna feed system comprising passive optical beamforming networks.

FIG. 12 is a block diagram showing a module of a multi-beam antenna feed system comprising a stack of n passive optical beamforming networks 24, each individual optical beamforming network 24 being configured as seen in FIG. 3. The respective phase shifts applied by each branch of the binary tree are indicated by parallelograms respectively labeled $\phi_1, \phi_2, \ldots, \phi_{m-3}, \phi_{m-2}, \phi_{m-1}, \phi_m$. The respective attenuation weights (for amplitude adjustment) are indicated by parallelograms labeled A. Each of the n passive optical beamforming networks 24 receives a respective optical beam from a demultiplexer (not shown in FIG. 12) having n outputs via respective optical couplers 40. The n optical beams have respective wavelengths $\lambda_1$ through $\lambda_n$. Each optical beamforming network 24 processes a unique wavelength. Each of the m groups of component signals which are phase shifted by a respective one of the phase shifts $\phi_1$, $\phi_2, \ldots, \phi_{m-3}, \phi_{m-2}, \phi_{m-1}, \phi_m$ are combined by respective multiplexers 42 to form respective composite optical signals. Those m composite optical signals are converted into respective 12-GHz composite RF signals by respective photodetectors (not shown in FIG. 12, but see FIG. 2), which composite RF signals are amplified by respective high-power amplifiers 28 on their way to m respective elements 30 of a transmit antenna array.

Figure 13:
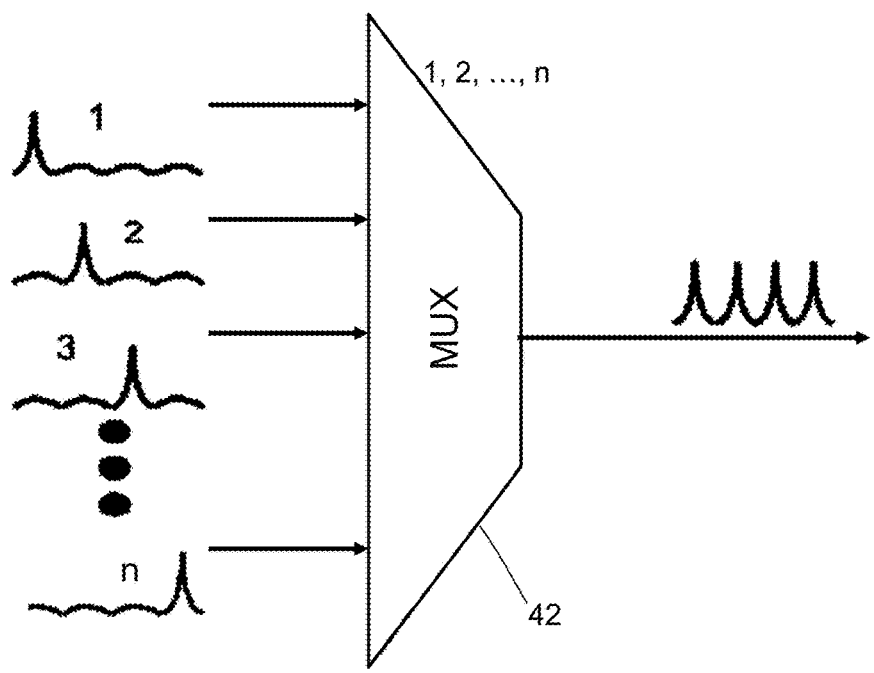
FIG. 13 is a diagram showing an optical multiplexer that receives a multiplicity of beamformed component signals of different wavelengths and combines them to form a wavelength-division multiplexed composite optical signal.

FIG. 13 shows an optical multiplexer 42 that is receiving n beamformed component signals of different wavelengths $\lambda_1$ through $\lambda_n$ and combines them to form a wavelength-division multiplexed composite optical signal.

Figure 14:
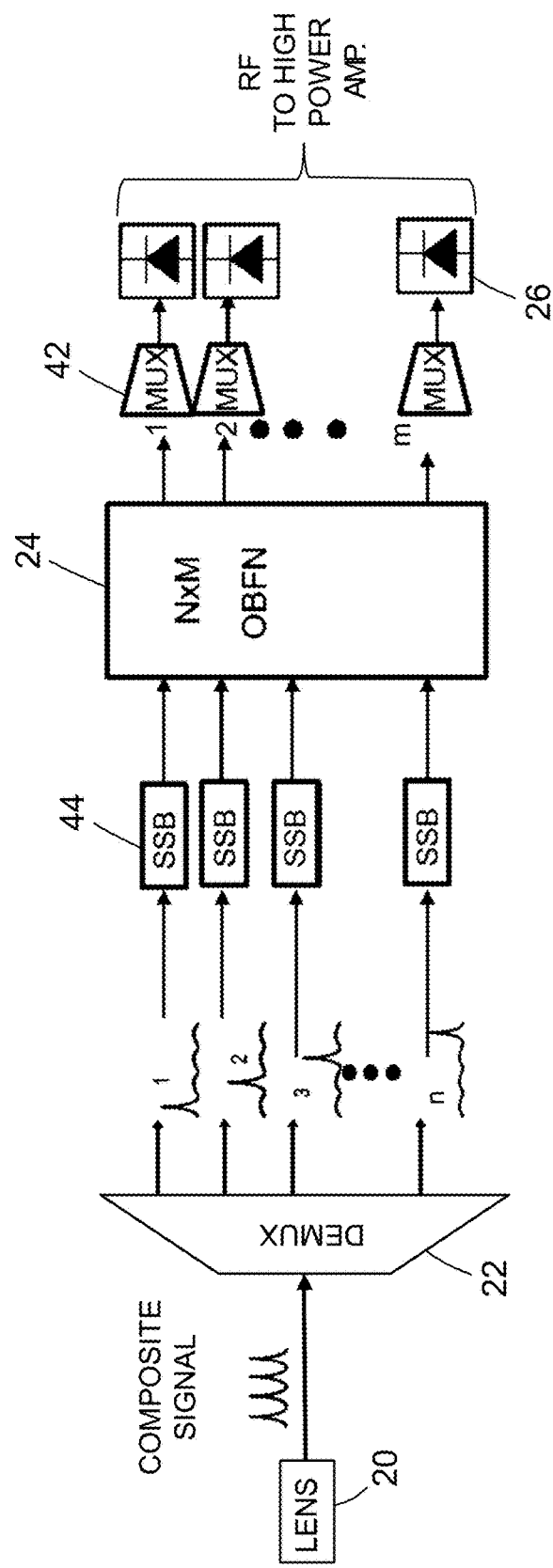
FIG. 14 is a diagram showing components of a signal processing system onboard a satellite that converts an uplinked wavelength-division multiplexed composite optical signal into RF signals for a multiplicity of spot beams to be broadcast in accordance with one embodiment.

FIG. 14 shows components of a signal processing system onboard a satellite that converts an uplinked wavelength-division multiplexed composite optical signal into RF signals for a multiplicity of spot beams to be broadcast in accordance with one embodiment. The system depicted in FIG. 14 comprises an optical demultiplexer 22 that receives a wavelength-division multiplexed composite optical from a lens 20 of a receiver telescope and splits the composite signal into n components having respective different wavelengths $\lambda_1$ through $\lambda_n$. The component optical signals are passed through respective optical single-sideband (SSB) filters 44 and into respective binary tree-based 1×m optical beamforming networks 24. Each optical beamforming network 24 processes a respective component optical signal of a unique wavelength and outputs a set of m beamformed component signals for that respective unique wavelength to respective multiplexers 42. Beamformed component signals having different wavelengths $\lambda_1$ through $\lambda_n$ but the same time delay are combined into respective wavelength-division multiplexed beamformed composite signals by respective optical multiplexers 42. These beamformed composite signals are converted to the electrical domain by respective photonic sensors 26 (e.g., photodetectors). The resulting RF electrical signals are amplified by respective RF power amplifiers (not shown in FIG. 14, but see FIG. 12). The amplified RF signals are then transmitted by respective elements of the transmit antenna array (not shown in FIG. 14, but see elements 30 in FIG. 12).

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A communications satellite comprising:
a lens;
a multiplicity of optical beamforming networks optically coupled to the lens, each optical beamforming network being a respective binary tree-based optical beamforming network comprising optical ring resonators and optical splitters optically coupled by waveguides and configured to split modulated optical carrier signals carrying data which pass through the lens into a multiplicity of optical signals, make time delay adjustments to those optical signals, and output time-delayed optical signals;
a multiplicity of photonic sensors for converting the time-delayed optical signals output by the multiplicity of optical beamforming networks into electrical signals; and
a transmit antenna array comprising a multiplicity of antenna elements electrically coupled to the photonic sensors and configured to convert the electrical signals from the photonic sensors into data-carrying radio-frequency signals which are broadcast in a direction which is a function of the time delay adjustments made by the multiplicity of optical beamforming networks.

2. The communications satellite as recited in claim 1, further comprising an optical demultiplexer having an input coupled to the lens and a multiplicity of outputs equal in number to the number of optical beamforming networks.

3. The communications satellite as recited in claim 2, further comprising a multiplicity of single-sideband filters respectively optically coupled to respective outputs of the optical demultiplexer and to an input of a respective optical beamforming network.

4. The communications satellite as recited in claim 3, wherein each single-sideband filter comprises an optical ring resonator.

5. The communications satellite as recited in claim 1, further comprising a multiplicity of multiplexers, each multiplexer having a multiplicity of inputs equal in number to the number of optical beamforming networks, wherein the inputs of each multiplexer are respectively optically coupled to outputs of respective optical beamforming networks, and each multiplexer having an output respectively optically coupled to an input of a respective photonic sensor.

6. The communications satellite as recited in claim 5, further comprising a multiplicity of RF power amplifiers having inputs electrically coupled to outputs of respective photonic sensors and having outputs electrically coupled to inputs of respective elements of the transmit antenna array.

7. A method for broadcasting a radio-frequency beam from a satellite in orbit, comprising:
   (a) uplinking a wavelength-division multiplexed composite optical signal comprising optical carrier signals of different wavelengths from a ground station to a telescope onboard the satellite, wherein each optical carrier signal is modulated to carry a respective set of data;
   (b) demultiplexing the wavelength-division multiplexed composite optical signal to form a multiplicity of optical signals having different wavelengths;
   (c) using respective binary tree-based optical beamforming networks comprising optical ring resonators configured with preset time delays for time delaying the multiplicity of optical signals having different wavelengths;
   (d) converting the time-delayed optical signals output by the binary tree-based optical beamforming networks into electrical signals; and
   (e) transmitting a radio-frequency beam containing the respective sets of data at a steering angle in response to receipt of the electrical signals by a transmit antenna array, the steering angle being a function of the preset time delays in the binary tree-based optical beamforming networks.

8. The method as recited in claim 7, further comprising single-sideband filtering the multiplicity of optical signals having different wavelengths subsequent to demultiplexing and prior to step (c).

9. A method for broadcasting a radio-frequency beam from a satellite in orbit, comprising:
   (a) uplinking a wavelength-division multiplexed composite optical signal comprising optical carrier signals of different wavelengths from a ground station to a telescope onboard the satellite, wherein each optical carrier signal is modulated to carry a respective set of data;
   (b) demultiplexing the wavelength-division multiplexed composite optical signal to form a multiplicity of optical signals having different wavelengths;
   (c) using passive optical beamforming networks configured with preset time delays for time delaying the multiplicity of optical signals having different wavelengths;
   (d) multiplexing the multiplicity of time-delayed optical signals having different wavelengths using a multiplicity of multiplexers to form composite optical beams that have the respective time delays;
   (e) converting the time-delayed composite optical beams into electrical signals; and
   (f) transmitting a radio-frequency beam containing the respective sets of data at a steering angle in response to receipt of the electrical signals by a transmit antenna array, the steering angle being a function of the preset time delays in the passive optical beamforming networks.

10. The method as recited in claim 9, further comprising converting the time-delayed composite optical beams into electrical signals prior to step (f).

11. A method for broadcasting a radio-frequency beam from a satellite in orbit, comprising:
   uplinking a wavelength-division multiplexed composite optical signal to the satellite, the components of the wavelength-division multiplexed optical beam comprising respective optical carrier signals having different wavelengths which are modulated to carry data;
   demultiplexing the wavelength-division multiplexed composite optical signal to form a multiplicity of optical signals having different wavelengths;
   time delaying the multiplicity of optical signals having different wavelengths using respective binary tree-based optical beamforming networks comprising optical ring resonators configured with time delays and optical splitters optically coupled by waveguides;
   converting the time-delayed optical signals into electrical signals; and
   transmitting radio-frequency signals at a steering angle in response to receipt of the electrical signals by a transmit antenna array, the steering angle being a function of the time delays, the radio-frequency signals being modulated to carry the data contained in the wavelength-division multiplexed optical beam.

12. The method as recited in claim 11, further comprising single-sideband filtering the multiplicity of optical signals having different wavelengths subsequent to demultiplexing and prior to time delaying.

13. A communications satellite system comprising:
   an optical gateway configured to transmit a wavelength-division multiplexed optical beam, the components of the wavelength-division multiplexed optical beam comprising respective optical carrier signals having different wavelengths which are modulated to carry data;
   a receive antenna configured to receive radio-frequency signals; and
   a communications satellite in orbit, wherein the communications satellite comprises:
   a telescope configured to receive the wavelength-division multiplexed optical beam from the optical gateway;
   a multiplicity of optical beamforming networks optically coupled to the telescope, each optical beamforming network being a respective binary tree-based optical beamforming network comprising optical ring resonators and optical splitters optically coupled by waveguides and configured to split modulated optical carrier signals carrying data which pass through the telescope into a multiplicity of optical signals, make time delay adjustments to those optical signals, and output time-delayed optical signals;
   a multiplicity of photonic sensors for converting the time-delayed optical signals output by the multiplicity of optical beamforming networks into electrical signals; and
   a transmit antenna array comprising a multiplicity of antenna elements electrically coupled to the photonic sensors and configured to convert the electrical signals from the photonic sensors into data-carrying radio-frequency signals which are broadcast in a direction which is a function of the time delay adjustments made by the multiplicity of optical beamforming networks,
   wherein the time delay adjustments are selected so that the broadcast data-carrying radio-frequency signals will be received by the receive antenna.

14. The system as recited in claim 13, further comprising an optical demultiplexer having an input coupled to the telescope and a multiplicity of outputs equal in number to the number of optical beamforming networks.

15. The system as recited in claim 14, further comprising a multiplicity of single-sideband filters respectively optically coupled to respective outputs of the optical demultiplexer and to an input of a respective optical beamforming network.

16. The system as recited in claim 13, further comprising a multiplicity of multiplexers, each multiplexer having a multiplicity of inputs equal in number to the number of optical beamforming networks, wherein the inputs of each multiplexer are respectively optically coupled to outputs of respective optical beamforming networks, and each multiplexer having an output respectively optically coupled to an input of a respective photonic sensor.

* * * * *